Figure 4:
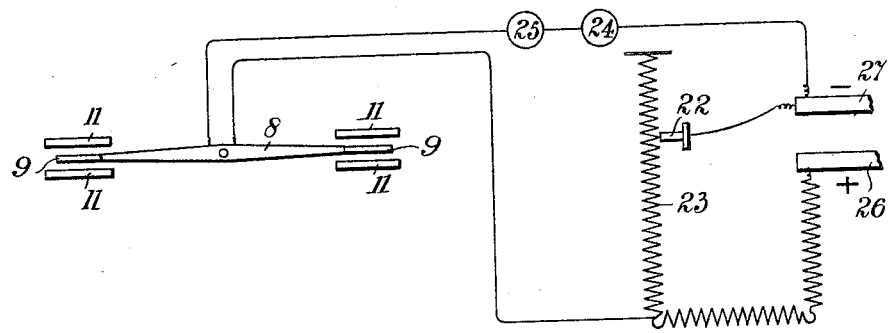

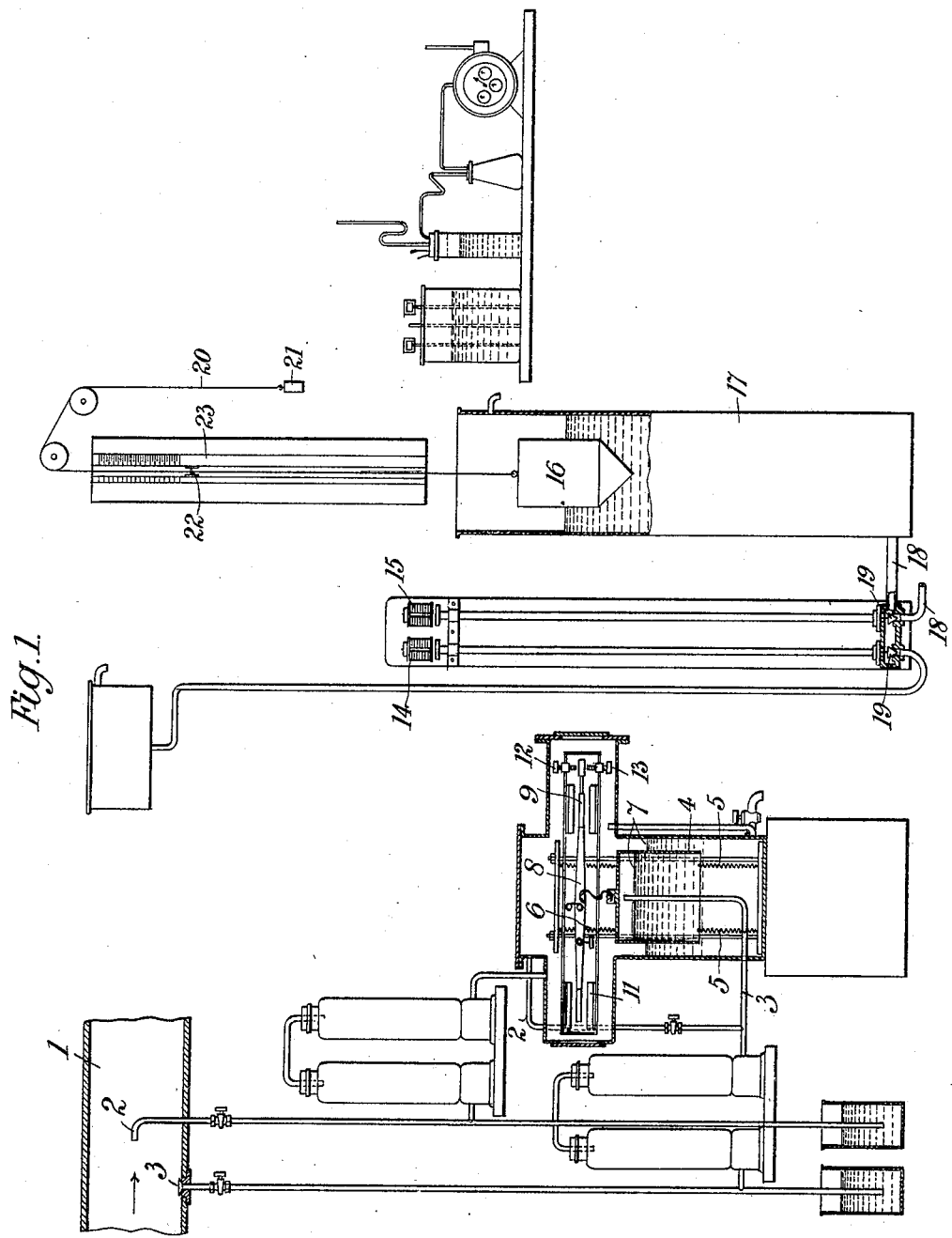

No. 803,029. PATENTED OCT. 31, 1905.
R. THRELFALL.
METERING FLUIDS.
APPLICATION FILED JUNE 16, 1903.
3 SHEETS—SHEET 2.
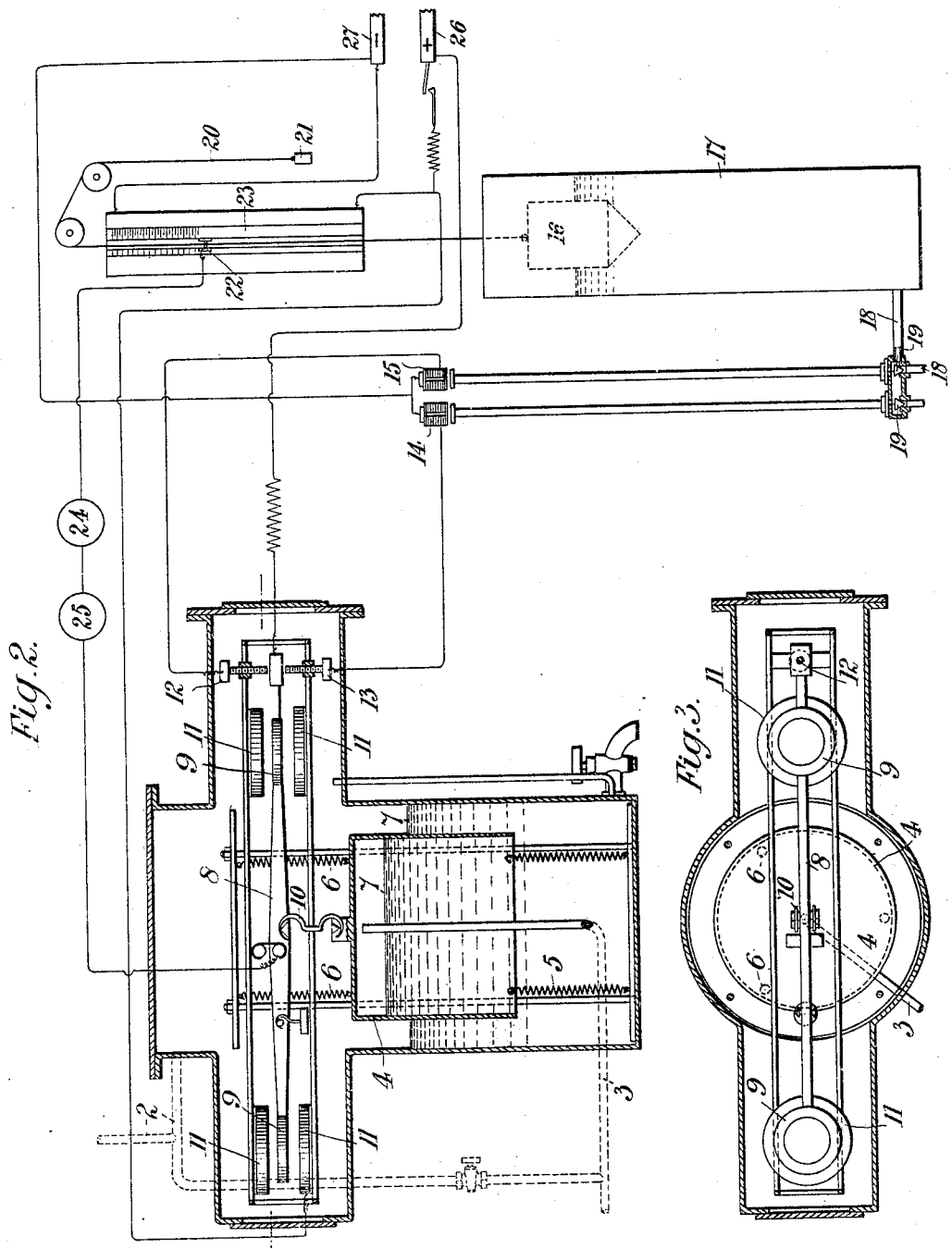
WITNESSES.
INVENTOR.
Richard Threlfall
by Foster Freeman & Watson
Attorneys No. 803,029.　　　　　　　　　　　　　　　　　　　PATENTED OCT. 31, 1905.
R. THRELFALL.
METERING FLUIDS.
APPLICATION FILED JUNE 16, 1903.
3 SHEETS—SHEET 3.

UNITED STATES PATENT OFFICE.

RICHARD THRELFALL, OF BIRMINGHAM, ENGLAND.

METERING FLUIDS.

No. 803,029.　　　　Specification of Letters Patent.　　　　Patented Oct. 31, 1905.

Application filed June 16, 1903. Serial No. 161,730.

*To all whom it may concern:*

Be it known that I, RICHARD THRELFALL, a subject of His Majesty the King of Great Britain, residing at Birmingham, England, have invented a certain new and useful Improvement in Metering Fluids, of which the following is a specification.

This invention relates to means by which the flow of fluids through a pipe or channel can be readily metered or recorded; and it consists in utilizing the velocity of flow of such fluid and the pressure produced thereby to operate the metering mechanism.

In order that the invention may be clearly understood, reference will be made to the accompanying drawings, which indicate one form of recording mechanism operated by the difference of pressure caused by the flow of the fluid in the pipe or channel acting through tubes placed in such pipe, the opening of one immediately facing the flow and the other opening being at right angles thereto.

It was shown in the eighteenth century by the French physicist Pitot that when a fluid in motion impinges on the open end of a tube containing the fluid at rest a pressure is produced in such tube, called a "Pitot" tube, corresponding to the loss of momentum of the moving fluid produced by its impact with the stationary fluid in the Pitot tube, and according to this invention the difference in pressure produced in the Pitot tube and the second or side-gage tube, as shown at 3, Fig. 1 of accompanying drawings, is utilized to actuate the recording or metering mechanism, as with this construction it is found that the difference of pressure as measured by a manometer between the outer ends of the Pitot and side-gage tubes, respectively, is rigorously proportional to the square of the velocity and to the density of the fluid where it impinges on the Pitot tube. As the distribution of velocity of a stream of gas across a pipe-section is dependent on local conditions, it is necessary to make a calibration of the flow of the gas by means of a Pitot tube, side gage, and a delicate manometer. The method of calculation will be given later. This calibration being once made, experiment shows that the distribution of velocity remains similar to itself when the velocity itself varies through a wide range. The Pitot tube may therefore be put at any point in the cross-section of the tube, preferably either the center or else the point of mean velocity, and a suitable constant deduced from the calibration be employed to connect the mean velocity across the section of the pipe with the Pitot tube and side-gage pressure difference. An alternative method is of course to insert in the pipe conveying the fluid a section of specially-shaped pipe, to which a predetermined constant will apply; but this course leads to unnecessary expense in the majority of cases.

It follows from the theory to be given later on that if we have a means of continually recording the square root of the quotient of the pressure difference given by the Pitot tube and side gage by the density of the fluid we have a quantity which at each instant is proportional to the velocity of fluid in the pipe and when multiplied by the sectional area of the pipe will give a quantity proportional to the delivery.

The square root of the density of the fluid may be taken as constant for the present purpose under approximately constant pressure and temperature in the case of gases and practically is always constant in the case of liquids.

In order to determine the delivery of fluid, it therefore becomes a question of effecting a time integration of the square root of the pressure difference. In the ordinary algebraic notation we have to record the value of $$K \int_0^T \frac{\sqrt{P}}{p} \, dt,$$

in which T and $dt$ refer to time, P is the pressure difference, $p$ the density of the fluid, K an instrumental constant depending on the graduation of the instrument, the calibration of the pipe conveying the fluid, the cross-sectional area of the pipe, and the units employed. When the density of the fluid may be treated as constant, the above formula simplifies to $$K' \int_0^T V \, dt,$$

being a fresh constant, and V the velocity of the fluid it is desired to integrate.

Figure 5:
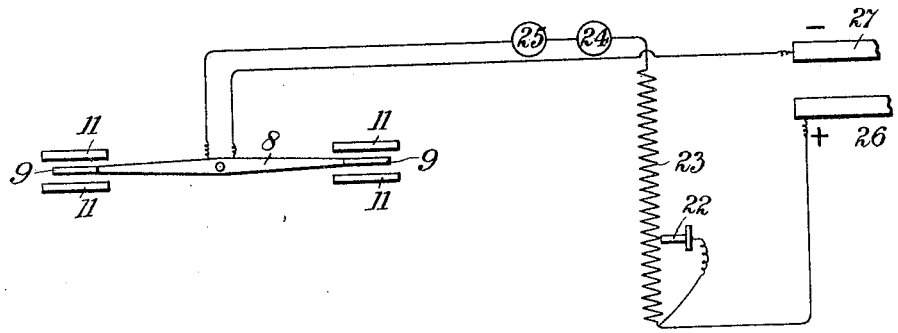

In the accompanying drawings, Figure 1 is a view, partly in elevation and partly in section, of an apparatus embodying the present invention. Figs. 2 and 3 are views, on an enlarged scale, of parts of an apparatus shown in Fig. 1. Figs. 4 and 5 are diagrammatic views.

The same numerals are employed in the different figures where they have corresponding parts, and one of the important mechanical features common to the majority of the instruments used to operate the recording mechanisms is a gas-holder of suitable capacity, the bell or float of which is supported and controlled by springs attached both above and below the bell and its motion governed by the difference in pressure in the Pitot and side-gage tubes.

In Fig. 1 the pipe or channel through which the fluid to be metered is passing is marked 1, the Pitot tube 2, and the side-gage tube 3, this latter being provided with a wide flange at the orifice arranged to be just within the tube 1 and having its axis at right angles to the line of flow, so that the fluid to be metered glides over the wide flange and so across the open end of pipe 3. The flange of pipe 3 may be suppressed, provided pipe 3 is small and does not project inwardly beyond the internal surface of pipe 1. The connection of these pipes 2 and 3 with the metering devices will be hereinafter described. If the side-gage tube 3 without a flange is allowed to project into the stream of fluid in pipe 1, it is found that the motion of the fluid across the open end of pipe 3 tends to draw out the fluid at rest in this pipe, and this tendency appears in the setting up of a negative pressure or suction in pipe 3. It is a matter of common knowledge, verified by my own experiments, that the suction thus set up is not so rigorously proportional to the square of the velocity of the fluid in pipe 1 where it crosses the end of pipe 3 as is the excess of pressure set up in the Pitot tube. For this reason it is necessary for accurate measurement to suppress all suction in the side-gage tube, and this is most easily and certainly attained if the side gage be constructed as described above, although other means are known whereby the same end may be attained.

Let P be the pressure difference in millimeters of water, as observed to exist by means of a manometer, and $p$ the density of fluid in motion in grams per cubic centimeter, the gages being as shown in Fig. 1. Let V be the velocity of the fluid in centimeters per second. Experiment shows that these quantities are connected by the relation—

$$V = 1.377 \sqrt{\frac{P \times 98.12}{p}}.$$

It is obviously possible, therefore, by moving tube 2 across pipe 1 to ascertain the velocity in the latter at as many points of the cross-section as may be desired.

Although I generally prefer to use the apparatus arranged as figured in Fig. 1, I do not wish to limit myself to this precise arrangement, and I intend the phrase "Pitot tube" and side gage, where it occurs in the sequel, to refer to any arrangement of these pieces of apparatus capable of giving a pressure difference so long as this pressure difference is free from any addition due to suction set up in the side-gage tube. In other words, I wish to limit myself to the use of the pressure produced by the impact of the moving fluid on the Pitot tube.

The floating bell 4 is not counterpoised by weights hung from cords or chains over pulleys, as usual, but is tied down from its lower rim by spiral springs 5, attached to a framework resting in the outer vessel. Spiral springs 6 are also stretched between the top of the bell and the top of the framework. In this way the bell can move up or down strictly in accordance with the difference of pressure of the gas on the inner and outer surfaces of the bell, respectively, the whole apparatus being closed in air-tight so as to be independent of the atmospheric pressure. The inner and outer surfaces of the bell are subjected to the pressure in pipes 3 and 2, respectively.

When metering dirty gases, it is sometimes advisable to pass same on their way to the meter through scrubbing bottles or vessels, taking care that no back pressure is thereby set up and to provide for the deposit of moisture or products of condensation, and it is of course a convenience to supply suitable taps, by which pressure can be cut off or intercommunication be effected when desired. The linear motion of the bell 4 may be made proportional to the difference of pressure within and without same by using long spiral springs, and in order that the construction and arrangement may be more readily understood reference is made to Figs. 2 and 3, which show this part of the apparatus upon a larger scale. The liquid 7, in which the bell is partly immersed, may be water or oil. The force on the floating bell is by these arrangements proportional to the difference of pressure acting within and without, respectively, and to obtain something to measure, varying as the square root of the force on the bell, an electrodynamic balance, preferably of the type known as an "ampere-balance," may be employed. It is placed above the floating bell and supported independently of it. The arm 8, carrying the movable coils 9, is attached by a hook 10 to the center of the floating bell 4, and the attachment may be at any point of the arm, subject to the condition that the hook or chain is of such a length that when the pressure inside and outside the bell is the same the balance is in equilibrium, with its movable coils 9 midway between the fixed coils 11, and the chain or hook taut. This is easily provided for by means of a counterpoise so adjusted as to give a slight upward pull to the bell. It is convenient to include as part of the hook or chain some arrangement, such as a right and left hand screw-coupling for adjustment. Two contact-points 12 and 13 are arranged in such a way that if the balance-arm is deflected above or below its equilibrium position it makes a contact with one or other of these points. For this purpose the balance-arm is provided with a contact-piece of some suitable metal, insulated from the balance-arm itself and moving between the points 12 and 13. A separate electric circuit (indicated in Fig. 2,) is arranged so that when the beam of the balance tilts up or down the contact-piece makes contact with the points 12 or 13 aforesaid and brings into action one or other of two electric magnets 14 or 15, Figs. 1 and 2, included in the circuit. These magnets release a mechanism, hydraulic, pneumatic, mechanical, or electric, (here shown for convenience of description as hydraulic,) and consisting of a float 16 in cylinder 17, provided with inlet and discharging passage 18, governed by valves 19, the rods of which are respectively attracted when magnets 14 or 15 are energized. From the float a cord 20 passes to a counterweight 21, and its motion causes a slider 22 to move over a set of resistance-terminals 23, (see also Fig. 1,) included in the circuit of the current flowing through the electrodynamic balance.

The balance-coils and any electrical instruments which it is desired to employ in measuring or registering the electric current or the ampere-hours are all in series, one end of the circuit being connected electrically to the sliding contact and the other to one end of the variable resistance. The variable resistance itself is in series with the source of electrical supply, so that the potential difference on the balance and instruments can be varied from zero to the full voltage available from the supply. The supply itself may be continuous or alternating, provided suitable electric measuring instruments are employed; but for the sake of convenience of description it will be assumed that continuous current is available. Thus, Fig. 2, the + main 26 is connected, through a switch and regulating-resistance, to one end of the resistance 23. The current is here divided, part passing simply through resistance 23 back to the negative terminal 27. The other part passes through all the coils of the balance in series, viz., the four coils marked 11, then by means of one of the ligatures of the balance into the moving coils, and then out through the other ligature, thence through electrical measuring instruments 25 and 24, and so back to the sliding contact 22, thence through part of the variable resistance back to main 27.

Turning now to the balance itself, the bell is arranged in such a way that the anemometric pressure tends to force the bell into the liquid. It is the function of the balance to oppose this tendency by its electrodynamic action, and this is brought about by so arranging the balance that when a current flows in it the electrodynamic force tends to lift the bell out of the liquid. Now the electrodynamic force, due to a current flowing in the coils of the balance, is proportional to the square of the current, and if this force always just balances the anemometric pressure, which, as we have seen, is proportional to the square of the velocity of the fluid to be measured, the current flowing in the balance will be proportional to the square root of the anemometric pressure—$i.\,e.$, to the fluid velocity itself—whenever there is equilibrium in the position of the movable arm of the balance. This condition is satisfied by arranging an electric circuit so as to include part of the variable resistance 23, above mentioned, an ampere-hour meter 24, and, if desired, an amperemeter 25, the electrodynamic balance, and the source of electric supply. The electric connections between the coils of the balance being well known are for the purpose of clearness omitted from the drawings.

The action is as follows: When the fluid whose motion is to be measured is at rest, the anemometer gives no pressure difference, and consequently no current is required to pass in the balance to give equilibrium. If a current happens to be passing, the balance-arm 8 makes contact with the contact-point 12 and sets in operation the mechanism, which reduces the applied potential difference to zero, and so stops the current. Then the balance assumes its equilibrium position between the contact-points and the regulating mechanism comes to rest. Now suppose that fluid begins to move past the anemometer. A pressure difference is set up in the anemometer-tubes 2 and 3, which is transmitted to the floating bell 4, and this tends to move downward into the liquid. In falling it pulls the balance-arm 8 down with it by the hook or chain 10, and so brings its contact-surface against the lower contact-pin 13. This contact enables the mechanism working the resistance to start operations, and the current from main 26 passes through pin 13 to magnet 14 and thence to return 27, and by energizing magnet 14 it raises valve 19, permitting liquid to enter cylinder 17, and float 16 therein rises and increases the variable resistance included in the balance-circuit and allows more and more current to flow through the balance-coils. This proceeds until the balance is again in equilibrium, the electrodynamic force balancing the pressure difference exerted over the gasholder. The balance-arm 8 then breaks contact with the pin 13 and all remains in equilibrium so long as the fluid whose velocity is being measured does not vary in velocity or density. The ampere-hour meter 24 included in the circuit is meanwhile registering the product of the current by the time and is thus performing a time integration of the current, and therefore giving a quantity proportional to the time integral of the flow of fluid in the pipe 1, which is of course the object in view.

In practice I generally arrange the variable resistance 23 as shown, so that it is always in series with the source of electric supply, the balance and ampere-hour meter in series being in parallel circuit across more or less of the resistance. This avoids sparking, &c., and is generally more convenient though less economical of current than having all in series. It is obvious that the variable resistance may also be used as a shunt, as diagrammatically illustrated in Fig. 4, to the balance-coils and ampere-hour-registering mechanism, this being an electrical equivalent of the arrangement just described. Also an equivalent construction is to put the variable resistance in direct series with the balance-coils, instruments, and mains, the sliding contact then merely short-circuiting more or less of the resistance, so as to reduce it from infinity to a proper value, as diagrammatically illustrated in Fig. 5. The simplest mechanism for varying the resistance when a water-supply is available is a small tank and float, as described; but I do not wish to limit myself to this arrangement. The ampere-hour meter selected must preferably be one that does not require a small but finite current to start it, as in any form of motor-meter it should preferably be of the controlled differential clock or electrolytic type.

In Fig. 1 are indicated two of the simplest forms of electrolytic meter, one being an ordinary copper voltameter and the other a gas-voltameter, the gas generated in which passes through a minute gas-meter.

In the majority of practical cases of gas measurement the difference of pressure given by the anemometer is exceedingly small, not exceeding about one centimeter of water. Consequently it is necessary to make the horizontal area of section of the floating bell large enough to give sufficient force to overcome the friction of the axles of the balance when the stream of fluid has less than the lowest velocity it is intended to meter.

It is obvious that whatever arrangements are adopted for obtaining a measurement in connection with an anemometer it will be mechanically simpler to arrange the apparatus so as to work either with a gas or with a liquid, not with both simultaneously. Consequently in measuring the flow of a hot wet gas, for instance, it is desirable to avoid condensation of the water in the working parts of the mechanism, and steps to this end must be taken by arranging cooling or drying vessels, or both, between the anemometer-tubes and the meter.

In all cases the calibration of the instrument may be checked by employing it in connection with a pipe having a known or measured rate of fluid delivery.

Having now particularly described and ascertained the nature of my said invention and in what manner the same is to be performed, I declare that what I claim is—

1. For metering the quantity of fluid which has passed through a pipe or channel in any given time, a combination with such pipe or channel of a Pitot tube, a side gage-tube terminating in a practically plane surface in the pipe or channel surrounding the opening in said tube and at right angles thereto and parallel to the lines of flow of the fluid for the purpose of avoiding suctional effect, and a registering-meter adapted to be operated by the difference of pressure set up in the Pitot tube and side gage-pipe by the flow of the fluid, substantially as described.

2. For metering the quantity of fluid which has passed through a pipe or channel in any given time, a combination with such pipe or channel of a Pitot tube, a side gage-tube terminating in a practically plane surface in the pipe or channel surrounding the opening in the said tube and at right angles thereto and parallel to the lines of flow of the fluid for the purpose of avoiding suctional effect, a bell, means for operating same by the difference of pressure set up in said tubes by the flow of the fluid, and a registering-meter and means for operating same connected with the bell, substantially as described.

3. For metering the quantity of fluid which has passed through a pipe or channel in any given time, a combination with such pipe or channel of a Pitot tube, a side gage-tube in which no suction is set up, a bell operated by the difference of pressure set up in the said tubes by the flow of the fluid, an electrodynamic mechanism operated by the movement of the bell and a registering apparatus operated by the movement of the electrodynamic mechanism substantially as described.

4. For metering the quantity of fluid which has passed through a pipe or channel in any given time, a combination with such pipe or channel of a Pitot tube, a side gage-tube in which no suction is set up, a bell operated by the difference of pressure set up in the said tubes by the flow of the fluid, an electrodynamic mechanism operated by the movement of the bell, a hydraulic mechanism and a metering apparatus operated by said mechanisms substantially as described.

In testimony whereof I have hereunto set my hand in the presence of two subscribing witnesses.

RICHARD THRELFALL.

Witnesses:
   HARRY GRIFF,
   B. RIDGWAY.